Aug. 5, 1958    M. E. RAY    2,846,262
CONVERTIBLE TRUCK COVER AND TENT
Filed May 28, 1956    3 Sheets-Sheet 1

Milton E. Ray
INVENTOR.

Aug. 5, 1958 M. E. RAY 2,846,262
CONVERTIBLE TRUCK COVER AND TENT
Filed May 28, 1956 3 Sheets-Sheet 2

Milton E. Ray
INVENTOR.

Aug. 5, 1958  M. E. RAY  2,846,262
CONVERTIBLE TRUCK COVER AND TENT
Filed May 28, 1956  3 Sheets-Sheet 3
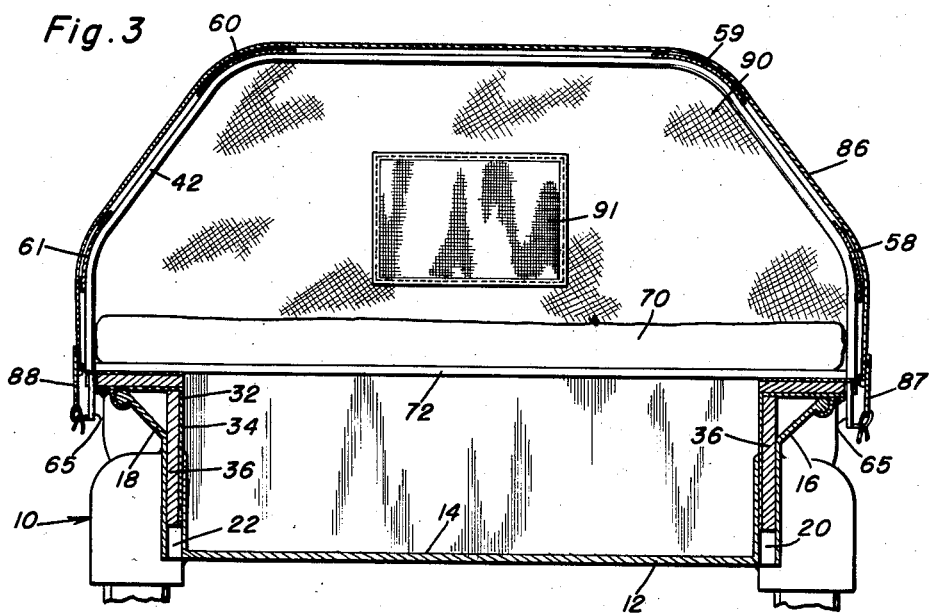
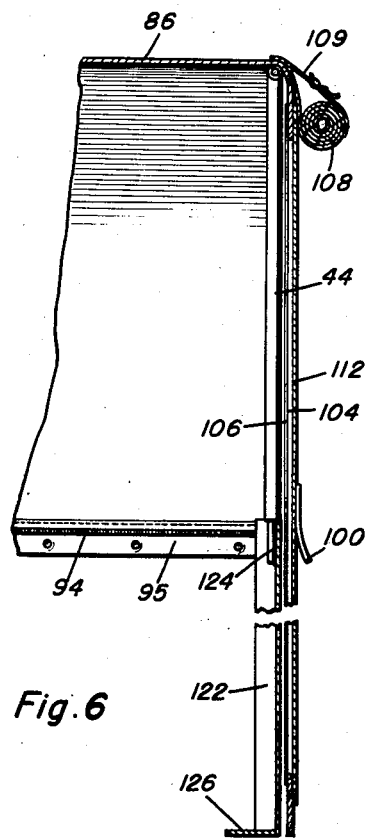
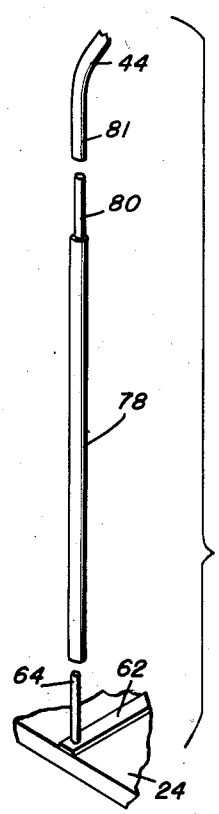
Milton E. Ray
INVENTOR.

United States Patent Office 2,846,262
Patented Aug. 5, 1958

2,846,262

CONVERTIBLE TRUCK COVER AND TENT

Milton E. Ray, Elko, Nev.

Application May 28, 1956, Serial No. 587,643

3 Claims. (Cl. 296—23)

This invention relates to a combination pick-up truck cover, bedstead and tent.

An object of the present invention is to provide a combination truck cover, bedstead and tent intended for the use of sportsmen, hunters, fishermen, campers, stockmen, etc., the combination device being so constructed that it is easily adjusted and converted from one use to another. When attached to the truck body it forms a low profile cover with the bed across the front end and on the top of the sideboards on the pick-up truck sides, yielding a maximum cargo space under the bed and for the full length of the truck body. In the event that the bed is not to be used for sleeping purposes during a trip, the base of the bed which is preferably a plywood board, may be placed flat on the bottom of the truck and the mattress or bedroll may be rolled and hauled in a usual manner. Accordingly the pick-up truck body may be loaded with cargo and equipment to the full height of the cover with the cargo and equipment under the cover.

Upon reaching the camp site, the pick-up body cover is separated from the truck and set up to form a tent apart from the truck, there being provision for increasing the height of the cover in order to form a very comfortable camping tent.

A further object of the invention is to provide an attachment for a pick-up truck body which is convertible from a truck cover to a tent and which utilizes a structural arrangement permitting a considerable majority of the supporting structure on the truck to be used in supporting the combination device apart from the truck as a tent.

A further object of the invention is to provide a practical device of the nature to be described. By practical is meant a device which is substantial and yet lightweight enough for one person to handle with a minimum of difficulty and a device which is not encumbered with a large number of movable parts, latches, bolts and the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a transverse sectional view of the combination device of Figure 1 showing the same fitted with the covering material;

Figure 6 is a sectional view taken approximately on the line 6—6 of Figure 2;

Figure 7 is an enlarged sectional view taken on the line 7—7 of Figure 2;

Figure 8 is an exploded fragmentary perspective view of one of the bows, the extensions and means to support the extension on the truck body.

Figure 5:
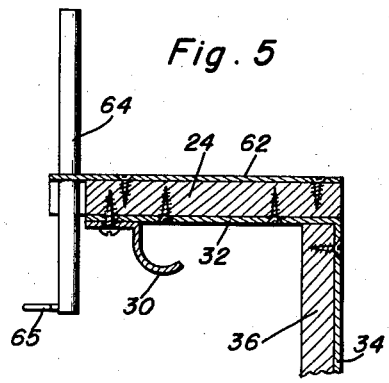
Figure 5 is an enlarged sectional view showing one of the sideboards for the truck body.
Figure 4:
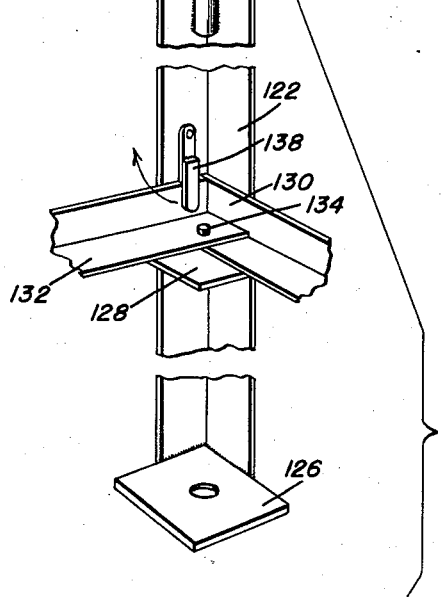
Figure 4 is a fragmentary perspective view of one of the legs of the bed supporting frame that is used in Figure 2.

Pick-up truck 10 is a standard truck typifying any of the manufacturer's makes of trucks. The truck body 12 has a floor 14 together with sides 16 and 18 that rise therefrom. In the illustrated truck the sides are fitted with sockets as at 20 and 22 which are ordinarily used to hold posts, side extensions and the like. Accordingly, the sideboards 24 and 26 utilize these sockets for the retention thereof on the truck body. Should the truck that is selected fail to have such sockets, other means of attaching the sideboards in place will be used. In the illustrated case, however, the sideboards extend along the upper edges of the sides 16 and 18 of the truck body, resting thereon and held in place by means of clamps 30 attached to the bottom side of the sideboards and engaging the rolled edges of the sides 16 and 18. Angle brackets 32 (Figure 5) are attached, as by screw fasteners or others, to the bottom surface of the sideboards and have the right angular leg 34 of each fitted with a post 36. This post may be bolted or otherwise attached to the vertical legs of the brackets and with these vertical legs are adapted to be inserted in the sockets 20 and 22. This leaves the entire interior of the truck body open for storage or other use.

A plurality of bows 40, 42 and 44 are mounted on the truck body, the bows extending transversely thereacross. Each bow has a center part, for example bow 40 having center part 46, and angular intermediate parts 48 and 50 that are integral with center part 46, together with angular ends 52 and 54, the ends being perpendicular to the center part 46 and the intermediate parts 48 and 50 being arranged at approximately 45° to each. This forms an arched construction for a neat appearance and for strength and rigidity. Stringers 58, 59, 60 and 61 are rigidly attached to the three bows 40, 42 and 44. Each of the stringers is made of a flat substantial material, as sheet metal so as to provide the necessary structural support and also to provide a firm supporting means for the covering that is to be placed on the bows and stringers.

Figure 1:
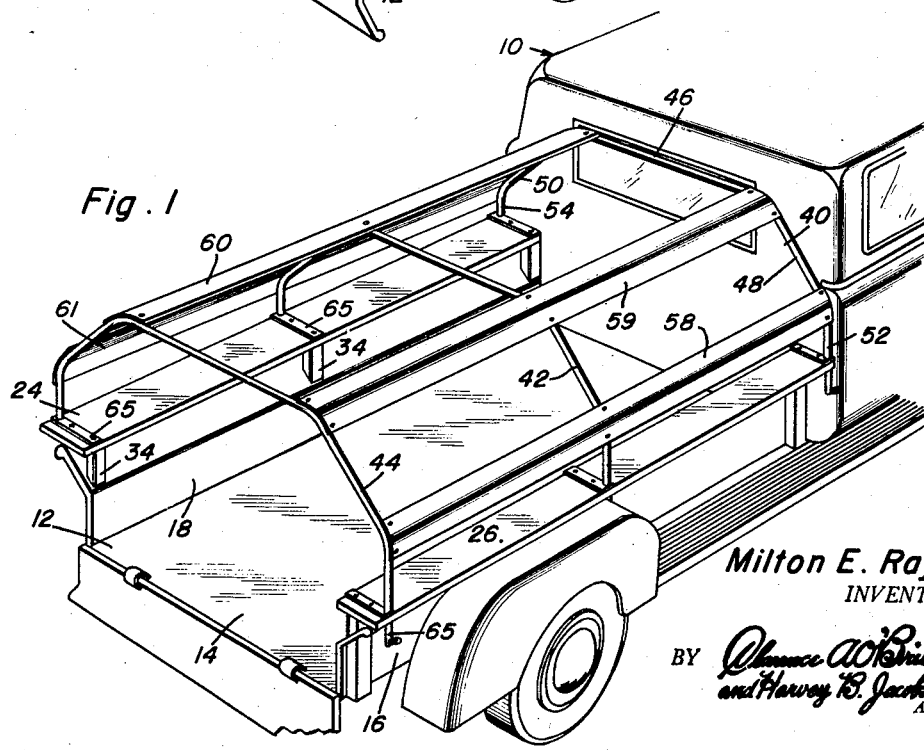
Figure 1 is a fragmentary perspective view of a typical, conventional pick-up truck fitted with a combination cover and tent that has been made in accordance with the principles of the invention.

Flat brackets, as brackets 62 (Figure 5) are placed transversely across the sideboards 26 and 24 at spaced places. They have short rods 64 fixed to them, one rod being attached to each bracket 62. The rod extends above and below its bracket, with the lower part of the rod functioning to support a hook or an eye 65 while the upper part of the rod is adapted to be passed into the bore of the ends of the bows. Accordingly, the bows are fitted over the rods and are thereby detachably secured onto the body. In this position there is ample room for a camper to sleep. A mattress 70 is placed on its support, as a plywood panel 72 (Figure 9), the latter extending across the truck body and resting on the sideboards 24 and 26. The same or an equivalent mattress and support would be used on the truck 10 as shown in Figure 1, that is with the device lower than that of Figure 9.

Figure 9:
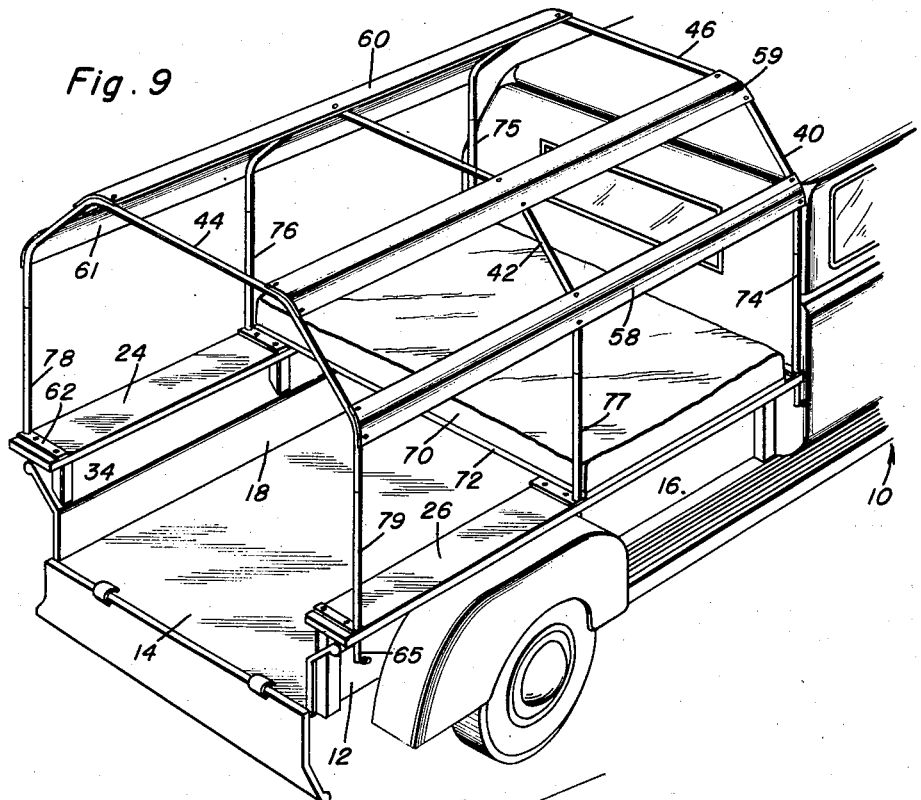
Figure 9 is a fragmentary perspective view of the truck showing a further possible use of the combination device.

In order to provide additional enclosed volume there are six spacers 74, 75, 76, 77, 78 and 79 respectively that are used for holding the combination truck cover and tent in an elevated position as shown in Figure 9. One of these spacers is shown in detail in Figure 8, each being identical. It consists of a hollow tube with a rod 80 welded or otherwise fixed in one end thereof. This rod accommodates the bore in the end 81 of one of the bows, while the opposite hollow end of the tube is fitted on one of the rods 64.

The covering for the described framework comprises a sheet 86 of water resistant material, for example canvas, some forms of nylon, duck and others. It extends over the stringers 58, 59, 60 and 61, the latter being longitudinally angulated in order to form the corners (Figure 3) of the cover and to provide a firm support for it. Short straps as at 87 and 88 are stitched or otherwise attached along the lower edges of the sheet 86, and by means of cords they are tied to the eyes 65. There is a front panel 90 that is provided with a window 91, and a rear panel that is fitted with a door or is made in flaps in order to have access to the interior of the truck body.

As shown in Figure 7 the covering includes the sheet 86 and has along the rear and side edges a slide fastener 94 beneath flap 95. One section of the slide fastener is stitched to the undersurface of flap 95 of sheet 86 and the other section of the slide fasteners is stitched to the side and rear covering panel 96. The rear panel 98 of the cover extends from the rear edge 99 of sheet 86 and overlies the ends of the side panels 96. It has flaps 100 and 101 with which to tie down the cover when used as shown in Figure 3. In addition it has an entrance opening 104 behind which there is a screen 106 hung from the top of the opening 104. Closure flap 108 is adapted to be rolled up and held by straps 109 and 110 and is adapted to be held down by the use of slide fasteners 112 and 114 along the edges thereof.

Figure 2:
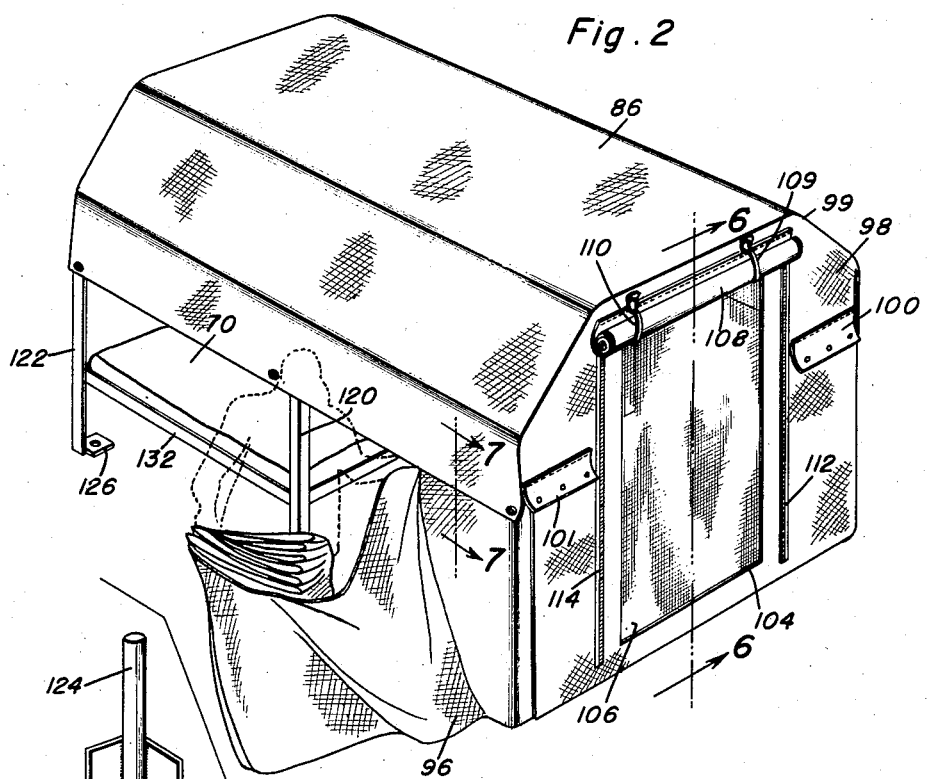
Figure 2 is a perspective view of the combination cover and tent which is being used as a tent.

When it is desired to separate the device from the truck 10 and use it as a tent, four posts such as those at 120 and 122 are used to support the bows 40 and 42. Each post comprises an angle iron support that has a rod 124 welded to the top end thereof. This rod functions in a manner identical to rods 64 in accommodating the end of one of the bows. A lower mounting plate 126 is attached to the post 122 and has an opening in it for the purpose of accommodating a peg. Another plate 128 is carried by post 122 and forms a seat for the corner 130, mattress frame 132. Pin 134 rises from plate 128 and is adapted to pass through an opening in corner 130 thereby holding the frame centered in place. The panel 72 together with the mattress 70 is adapted to be placed on the frame 132. In order to assure that it does not slip therefrom, a swinging latch 138 is pivoted to the post 122 and is adapted to overlie one of the flanges of the angle frame 132. After applying side panels 96 in the manner demonstrated in Figure 2 and arranging the door, the combination device is ready to be used for outdoor camping or other purposes.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A combination truck body cover and tent comprising a plurality of rigid bows having corners intermediate their ends, stringers attached to said bows and extending thereacross in order to form a unified structure of said bows, each of said stringers being angular in section and having flat parts contacting surfaces of said bows on opposite sides of a corner with the apex on the corner, a covering over said bows and stringers, means along the edges of said covering to attach side panels thereto, vertical supports operatively connected in a detachable manner to the ends of said bows in order to support said bows in an upright position, said supports including rods, the ends of said bows being hollow in order to accommodate said rods, posts attached to said rods, the upper edges of said posts constituting seats on which said hollow ends of said bows rest, plates secured to said posts between their upper and lower ends, and a mattress supporting frame mounted on said plates and rigidly interconnecting said posts.

2. A combination truck body cover and tent comprising a plurality of rigid bows, each bow having a plurality of corners intermediate the ends thereof, said ends of said bows having cavities, longitudinal angulated stringers attached to the corners of said bows and thereby unifying the bows and stringers into a single structure capable of being supported above a truck body to cover the same and capable of constituting the upper part of the tent, vertical supports to hold said unified structure elevated and comprising posts at the corners of said structure, each post having an upwardly extending pin of a dimension which fits into a cavity of an end of one of said bows, the lower surface of said end of said bow contacting the upper surface of said post to limit the penetration of said pin into said cavity, means connected to each post for anchoring each post, a covering on said bows and said stringers, the lower edges of said cover having fasteners which are adapted to connect with the sides of the vehicle body and which are selectively adapted to connect with the upper edges of side panels when said structure is used as the upper part of a tent and when said structure is utilized as a covering for a vehicle body but is vertically spaced from the same by posts, intermediate posts at the sides of said unified structure, an intermediate bow connected to said intermediate posts, and means between the ends of one pair of the first mentioned posts and said intermediate posts for interconnecting the same and for supporting a mattress in an elevation located between the upper and lower ends of said intermediate posts.

3. A combination truck body cover and tent comprising an upper framework including a plurality of rigid bows having vertically depending portions at opposite ends thereof, a plurality of stringers rigidly interconnecting said bows and maintaining the same in spaced relation so as to encompass an area comparable to that of a truck body upon which the cover is to be placed, the lower ends of said depending portions being adapted for detachable connection to a truck body, a lower framework for supporting the upper framework in elevated relation to the ground for use as a tent, said lower framework including a plurality of uprights detachably connected at their upper ends to the lower ends of said depending portions of said bows, means interconnecting and rigidifying certain of said uprights, said means forming a frame for supporting a mattress and support therefor in elevated position, a cover on said upper framework, and side panels on said lower framework forming, with said cover, an enclosure for said framework when assembled.

References Cited in the file of this patent

UNITED STATES PATENTS

| | | |
|---|---|---|
| 739,484 | Elsey | Sept. 22, 1903 |
| 741,367 | Parish | Oct. 13, 1903 |
| 912,840 | Graham et al. | Feb. 16, 1909 |
| 2,173,076 | Stetson | Sept. 12, 1939 |
| 2,301,089 | Stevens | Nov. 3, 1942 |
| 2,604,671 | Sherman | July 29, 1952 |
| 2,692,795 | Lander | Oct. 26, 1954 |